United States Patent
Wilkinson, III et al.

(10) Patent No.: US 11,649,578 B2
(45) Date of Patent: May 16, 2023

(54) SUSPENSION DAMPER WITH FLUID CONTAMINANT PROTECTION

(71) Applicant: Suspa GmbH, Altdorf (DE)

(72) Inventors: Glen Robert Wilkinson, III, Middleville, MI (US); Jonathan David Bruin, Grand Rapids, MI (US); David Stuart Atwater, Grand Rapids, MI (US)

(73) Assignee: Suspa GmbH

( * ) Notice: Subject to any disclaimer, the term of this patent is extended or adjusted under 35 U.S.C. 154(b) by 268 days.

(21) Appl. No.: 17/078,984

(22) Filed: Oct. 23, 2020

(65) Prior Publication Data

US 2021/0123177 A1    Apr. 29, 2021

Related U.S. Application Data

(60) Provisional application No. 62/926,863, filed on Oct. 28, 2019.

(51) Int. Cl.
| | | |
|---|---|---|
| D06F 23/04 | (2006.01) |
| D06F 37/24 | (2006.01) |
| F16M 13/02 | (2006.01) |
| F16F 15/04 | (2006.01) |

(52) U.S. Cl.
CPC ............. D06F 37/24 (2013.01); D06F 23/04 (2013.01); F16F 15/04 (2013.01); F16M 13/02 (2013.01); *F16F 2224/02* (2013.01); *F16F 2230/0052* (2013.01); *F16F 2232/08* (2013.01); *F16F 2234/08* (2013.01); *F16F 2236/04* (2013.01)

(58) Field of Classification Search
CPC .......... D06F 37/24; D06F 23/04; D06F 37/20; D06F 37/268; D06F 37/22; F16F 15/04; F16F 2224/02; F16F 2230/0052; F16F 2232/08; F16F 2234/08; F16F 2236/04; F16F 1/12; F16F 7/08; F16M 13/02
See application file for complete search history.

(56) References Cited

U.S. PATENT DOCUMENTS

| | | | |
|---|---|---|---|
| 7,549,519 B2 | 6/2009 | Atwater et al. | |
| 2003/0183994 A1* | 10/2003 | Atwater | F16F 13/007 |
| | | | 267/71 |
| 2009/0031760 A1* | 2/2009 | Kim | D06F 37/20 |
| | | | 68/23.1 |
| 2014/0367536 A1* | 12/2014 | Wong | D06F 37/264 |
| | | | 248/176.1 |
| 2017/0268148 A1* | 9/2017 | Davis | D06F 37/268 |
| 2021/0071339 A1* | 3/2021 | Kim | D06F 37/24 |

FOREIGN PATENT DOCUMENTS

WO    2015125075 A1    8/2015

* cited by examiner

*Primary Examiner* — Terrell L McKinnon
*Assistant Examiner* — Jerry Nmn Olivier
(74) *Attorney, Agent, or Firm* — Price Heneveld LLP

(57) ABSTRACT

A suspension damper for washing machines includes a control rod that is configured to attach a fixed bracket of a washing machine cabinet and a first cap having an aperture through which the control rod slidingly extends. The first cap is configured to engage a concave portion of a bracket on a drum of the washing machine. A second cap is disposed on the control rod, and a spring is disposed between the first cap and the second cap. The first cap includes at least one water passageway for guiding water along an outer surface of the first cap. An umbrella may be disposed on the control rod to shed water outwardly away from the control rod.

20 Claims, 4 Drawing Sheets

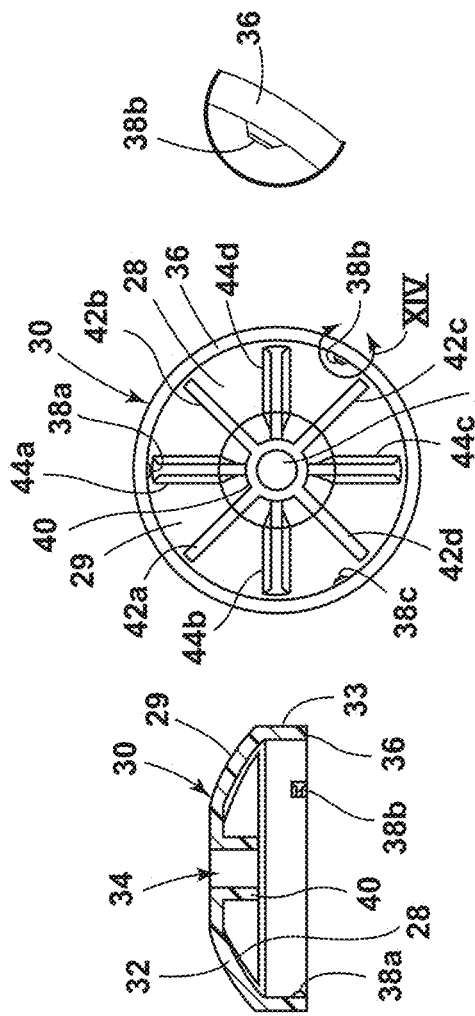
FIG. 11
FIG. 12
FIG. 13
FIG. 14
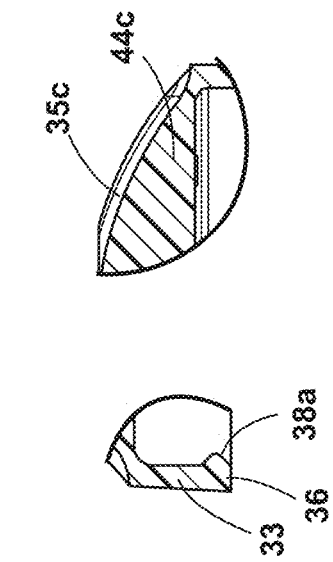
FIG. 15
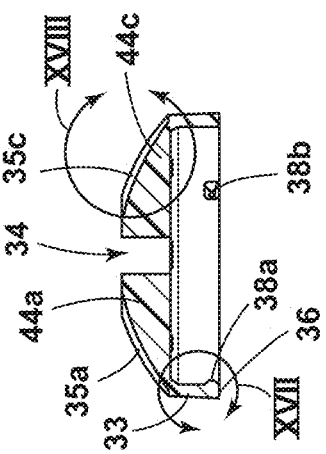
FIG. 16
FIG. 17
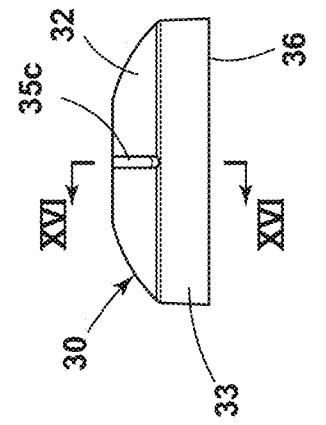
FIG. 18

SUSPENSION DAMPER WITH FLUID CONTAMINANT PROTECTION

CROSS-REFERENCE TO RELATED APPLICATION

This application claims the benefit under 35 U.S.C. § 119(e) to U.S. Provisional Patent Application No. 62/926,863, filed Oct. 28, 2019, entitled "SUSPENSION DAMPER WITH FLUID CONTAMINANT PROTECTION," which is incorporated herein by reference in its entirety.

BACKGROUND OF THE INVENTION

The present invention relates to suspensions for use in connection with washing machines.

Suspensions for washing machines may comprise a spring that is coupled to a rod and attached between a cabinet of the washing machine and a drum for the clothing being washed. The suspension may include a damping material providing a frictional interface to decrease harmonic motion of the drum. U.S. Pat. No. 7,549,519 discloses a version of a damper in which some movement of the washer drum is allowed before damping occurs. Other examples of dampers employed in a washing machine environment include U.S. Pat. No. 7,445,098, U.S. Publication No. 2003/0183994, and International Patent Application Publication No. WO 2015/125075 A1.

SUMMARY OF THE INVENTION

One aspect of the present disclosure is a damper for a washing machine that includes a cabinet and a drum. The cabinet has a plurality of fixed brackets, and the drum has a plurality of brackets that move with the drum. The damper includes a control rod that is configured to attach to one of the plurality of fixed brackets, and a first cap having an aperture through which the control rod slidingly extends. The first cap is configured to engage a concave portion of one of the plurality of brackets on the drum. A second cap is disposed on the control rod, and a spring is disposed between the first cap and the second cap. The first cap includes at least one water passageway for guiding water along an outer surface of the first cap away from the control rod.

Embodiments of the first aspect of the disclosure may include any one or a combination of the following features:
  The water passageway may optionally comprise a groove formed in the outer surface of the first cap.
  The outer surface of the first cap may be generally hemispherical.
  The damper may optionally further include an umbrella having an aperture for receiving the control rod, wherein the umbrella is disposed on the control rod above the first cap to shed water flowing down the control rod away from the control rod.
  The umbrella may optionally comprise an aperture having a plurality of inwardly-projecting surfaces that contact the control rod, the aperture further including at least one surface that is spaced-apart from an outer surface of the control rod.
  The aperture optionally includes an annular flange projecting inwardly at an upper surface of the umbrella and sealingly contacting the control rod.
  The at least one water passageway optionally comprises a plurality of water passageways.
  The plurality of water passageways optionally comprise grooves formed in the outer surface of the first cap, wherein the grooves are equally spaced-apart and extend longitudinally.
  The first cap is optionally formed of integrally molded polymeric material.

Another aspect of the present disclosure is a damper for a washing machine having a cabinet and a drum, the cabinet having a plurality of fixed brackets and the drum having a plurality of brackets that move with the drum. The damper includes a control rod having an end for attaching to one of the plurality of fixed brackets. The damper further includes a bearing having an aperture through which the control rod slidingly extends, wherein the bearing is configured to engage one of the plurality of brackets on the drum. An end cap is disposed at a bottom of the control rod, and a spring is disposed between the end cap and the bearing. The damper further includes an umbrella having an aperture for receiving the control rod. The umbrella is disposed on the control rod above the bearing to shed water flowing down the control rod away from the control rod. An upper edge of the aperture sealingly engages the control rod, and a surface of a lower portion of the aperture is spaced-apart from the control rod to form a gap.

Embodiments of the second aspect of the disclosure may include any one or a combination of the following features:
  The umbrella optionally includes an inner surface having a first portion and a plurality of raised surface features projecting inwardly from the first portion whereby the raised surface features engage the control rod and form a gap between the first portion and the rod.
  The gap optionally has an open bottom to permit fluid to drain out of the gap.
  The first portion of the inner surface is optionally cylindrical.
  The raised surface features optionally comprise ridges.
  The ridges optionally extend lengthwise along the control rod.
  The upper edge optionally comprises an inwardly-extended tapered flange.
  The tapered flange optionally includes a circular inner edge that engages the control rod.
  The inner edge is optionally deformed elastically to form a watertight interference fit around the control rod.
  The bearing optionally includes an outer surface having at least one water passageway formed by a groove in the outer surface of the bearing.
  The outer surface of the bearing may optionally be hemispherical and the groove may optionally extend radially outward from the aperture in the bearing.

These and other features, objects and advantages of the present invention will become apparent upon reading the following description thereof together with reference to the accompanying drawings.

BRIEF DESCRIPTION OF THE DRAWINGS

FIG. 11 is a top view of a hemispherical cap used in the damper shown in FIGS. 2-4;

FIG. 12 is a cross-sectional side view of the hemispherical cap taken along line XII-XII in FIG. 11;

FIG. 13 is a bottom view of the hemispherical cap shown in FIG. 11;

FIG. 14 is an enlarged fragmentary view of the region identified as XIV in FIG. 13;

FIG. 15 is a side view of the hemispherical cap shown in FIGS. 11 and 13;

FIG. 16 is a cross-sectional side view of the hemispherical cap taken along line XVI-XVI in FIG. 15;

FIG. 17 is an enlarged fragmentary cross-sectional view of the region identified as XVII in FIG. 16; and FIG. 18 is an enlarged fragmentary cross-sectional view of the region identified as XVIII in FIG. 16.

DETAILED DESCRIPTION OF THE PREFERRED EMBODIMENT

One issue with known suspensions for washing machines is that, during use, water and/or other liquids may come into contact with the suspension components. This may interfere with proper frictional damping and/or lead to premature failure.

One aspect of the present disclosure is an improved damper which has water-dispersion capabilities for shedding liquid, namely, one with a hemispherical cap and an umbrella disposed on a control rod. It may also be desirable to provide a reliable, long life damper which can largely be molded of a polymeric material with a minimum number of components.

Figure 1:
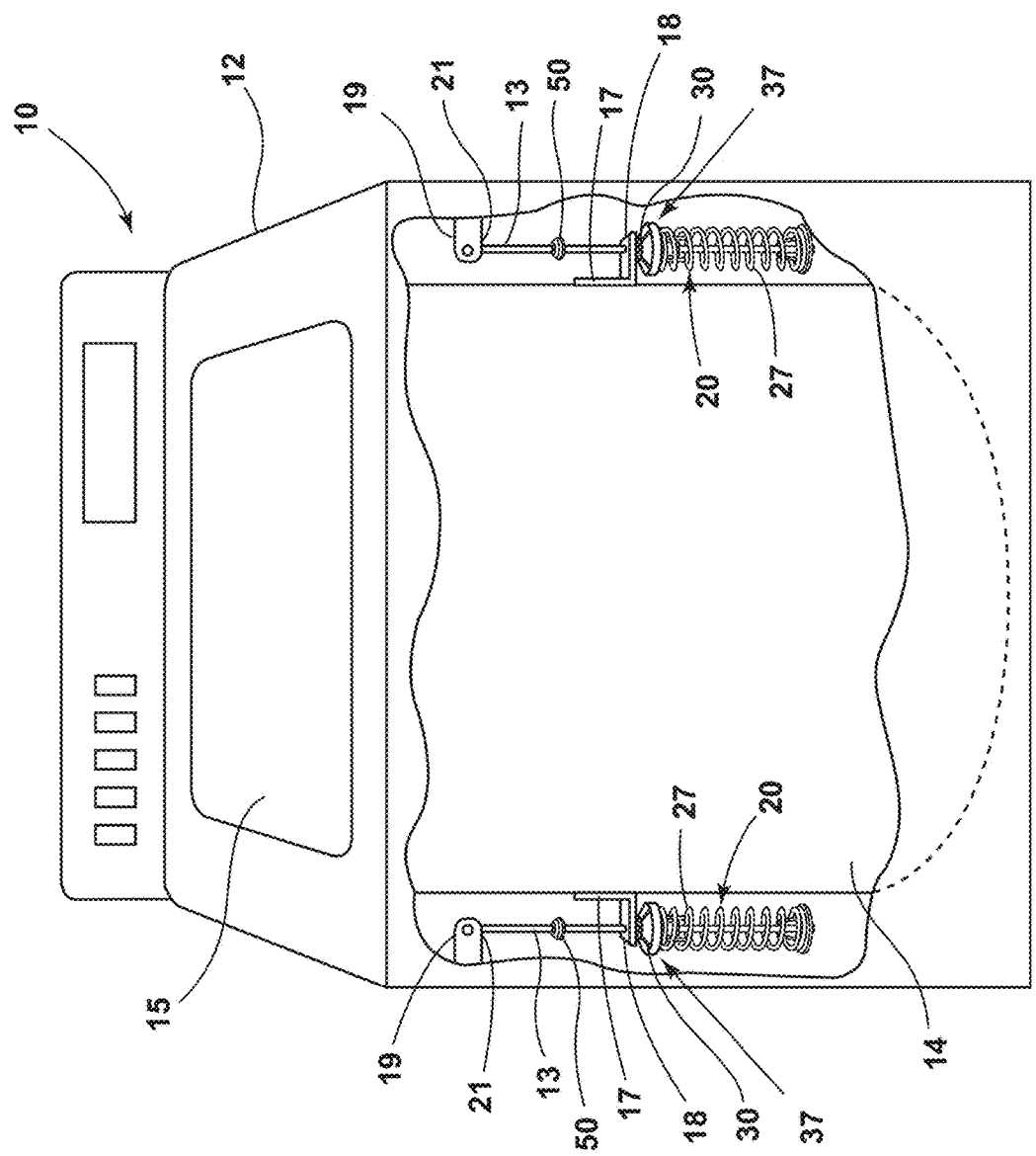
FIG. 1 is a partially schematic perspective view of a washing machine, shown partly broken away, illustrating the mounting of two dampers.

Referring initially to FIG. 1, a washing machine 10 includes a cabinet and frame 12 and a top-loading drum 14 for receiving clothes to be laundered through a hinged cover 15. Drum 14 rotates and agitates the clothes during wash and spin dry cycles and is subject to vibrations during normal operation of the machine, particularly when there are unbalanced loads. Drum 14 is supported by a plurality of dampers 20 (two are shown in the pictorial diagram of FIG. 1) at various locations. The dampers 20 are mounted to drum 14 by brackets 17. The bracket 17 comprises an existing bracket of a known design having a concave end 18 surrounding and engaging a first cap 30 of bearing assembly 37 of damper 20. Damper 20 also includes a control rod 13 extending therefrom. End 21 of control rod 13 is secured to the cabinet and frame 12 of the washing machine by a fixed bracket 19. Fixed bracket 19 may comprise an existing bracket of a known design. As discussed in more detail below, bearing assembly 37 provides for linear sliding motion of cap 30 along control rod 13. Thus, dampers 20 may (optionally) be configured to be used as direct replacements in washing machines having conventional frames 12, drums 14, and brackets 17 and 19. However, in contrast to prior art dampers, the damper 20 of the present disclosure provides an improved open architecture and water-dispersion capabilities for shedding water and/or other liquids away from the bearing assembly 37 and/or control rod 13. By open architecture, it is meant that the damper elements are not housed within a cylindrical chamber but rather are open, as seen, for example, in the assembled views of FIGS. 2-4. Four such dampers 20 may be employed for suspending the drum 14 within cabinet 12 to provide damping for the washing machine drum 14. However, more or fewer than four dampers 20 may also be utilized.

Figure 3:
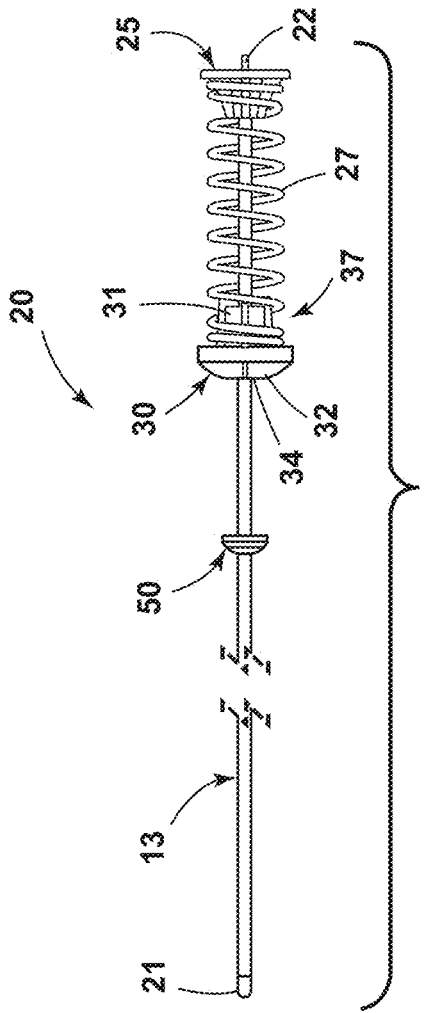
FIG. 3 is a fragmentary front elevational view of the damper shown in FIG. 2.
Figure 4:
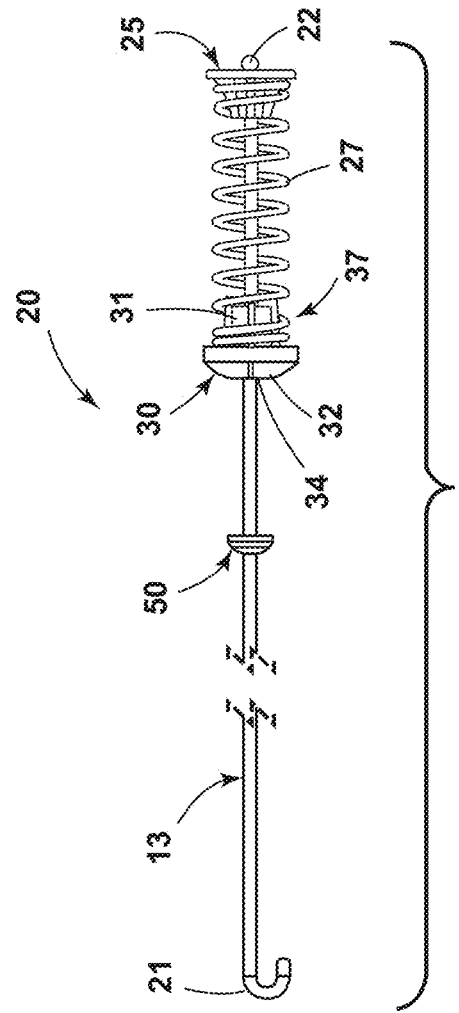
FIG. 4 is a fragmentary side view of the damper shown in FIGS. 2 and 3.
Figure 2:
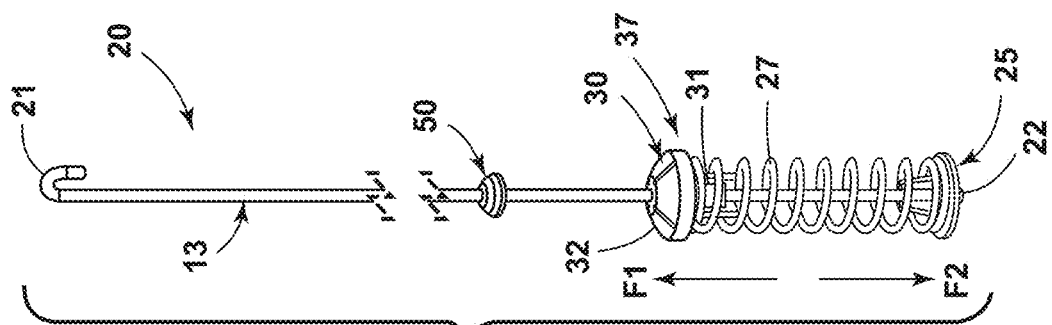
FIG. 2 is a fragmentary perspective view of a damper according to one aspect of the present disclosure.
Figure 5:
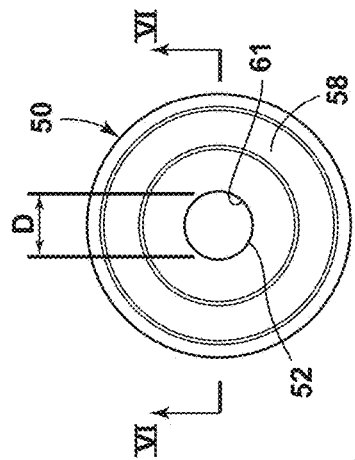
FIG. 5 is a fragmentary top plan view of an umbrella used in the damper shown in FIGS. 2-4.

An example of a damper 20 is shown in FIGS. 2-4. The damper 20 includes: a control rod 13 having a hooked upper end 21 for attaching to one of the plurality of fixed brackets 19; and a bearing assembly 37 including a first cap such as a hemispherical cap 30 having an aperture 34 (FIG. 11) through which the control rod 13 slidingly extends. The cap 30 may, optionally, have a hemispherical surface configured for engaging a concave portion of one of the plurality of brackets 17 on the drum 14. Damper 20 may further include a second or end cap 25 disposed at a bottom end 22 of the control rod 13, and a spring 27 disposed between the end cap 25 and the hemispherical cap 30. In use, spring 27 is in compression and provides forces F1 and F2 that act on bearing assembly 37 and end cap 25 in opposite directions to bias end cap 25 and bearing assembly 37 away from each other. The hemispherical cap 30 may be fixedly attached to a bearing housing 31 of a bearing assembly 37. Bearing assembly 37 provides linear sliding motion of hemispherical cap 30 and bearing housing 31 along control rod 13. Bearing assembly 37 and/or hemispherical cap 30 may be configured to provide a predefined frictional engagement with control rod 13 to thereby generate a predefined frictional force that tends to resist movement of control rod 13 relative to bearing assembly 37. The predefined frictional force may be selected to reduce vibration (movement) of drum 14 relative to cabinet and frame 12 in use. For example, the predefined frictional force may be selected to decrease or eliminate harmonic motion that may occur as drum 14 ramps up to full spin speed (r.p.m.). The damper 20 may further include an umbrella 50 having an aperture 52 (FIG. 5) for receiving the control rod 13. As discussed in more detail below, the umbrella 50 is disposed on the control rod 13 above the bearing assembly 37 to shed water flowing down the control rod 13 away from the control rod 13.

As shown in FIGS. 11, 15, 16, and 18, the hemispherical cap 30 may comprise a suitable polymer material such as HDPE. Hemispherical cap 30 includes a hemispherical upper wall 29 having a hemispherical upper surface 32. Hemispherical cap 30 also includes a cylindrical rim 33 that extends downward from the periphery of the hemispherical upper surface 32. The cylindrical rim 33 includes a bottom edge 36. As shown in FIGS. 12 and 13, hemispherical cap 30 includes a central hub 40 that is provided to strengthen the area surrounding the aperture 34. As shown in FIGS. 13, 16, and 18, a first set of ribs 42a-42d and a second set of ribs 44a-44b may be provided that extend from an inner surface 28 of hemispherical wall 29 to the central hub 40 to strengthen the entire structure. As shown in FIGS. 12-14 and 16-17, hemispherical cap 30 may include a plurality of tabs 38a-38c that protrude inwardly from the bottom edge 36 of the cylindrical rim 33. The tabs 38a-38c are provided to engage corresponding structure on the bearing housing 31 so as to secure the hemispherical cap 30 on the bearing housing 31.

The hemispherical cap 30 may include at least one water passageway such as one or more grooves 35a-35d in upper surface 32 for guiding water outwardly and downwardly along an upper surface 32 of the hemispherical cap 30. When mounted to a washing machine 10, such as shown in FIG. 1, the surface 32 of hemispherical cap 30 engages (contacts) mounting bracket 17 to allow the damper 20 to engage in a ball-socket type connection in a known manner. It will be understood that cap 30 could have virtually any shape, and need not have a hemispherical upper surface.

Figure 6:
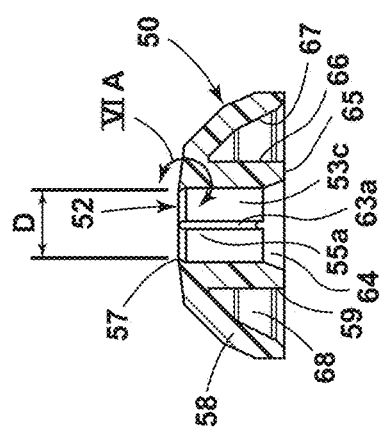
FIG. 6 is a cross-sectional side view of the umbrella as taken along line VI-VI in FIG. 5.

With reference to FIGS. 5-10, umbrella 50 may comprise a suitable polymer material (e.g., polypropylene), and includes a shell 58 that is integrally formed with a central hub 59 (FIG. 6). The umbrella 50 includes an aperture 52 in upper surface 57 of shell 58. Aperture 52 includes a plurality of surface portions 53a-53c, and a plurality of raised surface features such as ridges 55a-55c that project inwardly from the surface portions 53a-53c which may be substantially cylindrical. Surface portions 53a-53c are spaced-apart from control rod 13 to form a gap G (FIG. 10) that is open at a bottom thereof to permit liquid or other matter to drain or exit the gap G due to gravity.

Figure 6A:
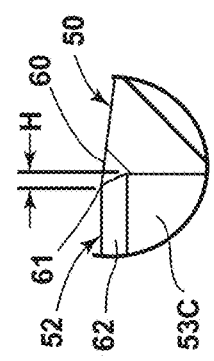
FIG. 6A is a fragmentary enlarged view of the region identified as VI A in FIG. 6.
Figure 7:
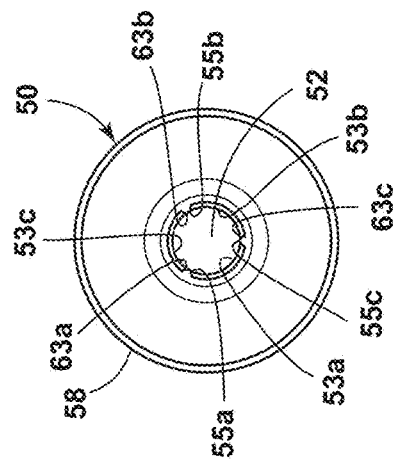
FIG. 7 is a bottom view of the umbrella shown in FIG. 5.
Figure 8:
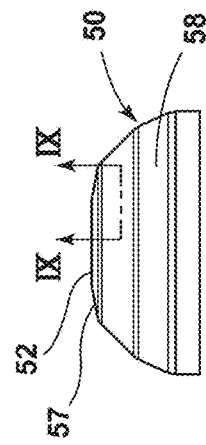
FIG. 8 is a side view of the umbrella shown in FIGS. 5 and 7.

With reference to FIGS. 6 and 6A, umbrella 50 also includes an inwardly-extending flange or lip 60 having an edge 61 and forming a chamfered or tapered annular surface 62. Edge 61 of lip 60 has a diameter "D" (FIGS. 5 and 6) that may be about the same as a diameter of the control rod 13 to thereby contact control rod 13 and provide a tight seal where control rod 13 extends through umbrella 50 (FIGS. 2-4). The diameter D of aperture 52 at edge 61 may be slightly smaller than a diameter of control rod 13 to thereby provide an interference fit to ensure that liquid does not flow into aperture 52. Longitudinal ribs 55a-55d include linear inner edges 63a-63c that define an "imaginary" cylinder having a diameter that may be substantially identical to the diameter D formed by edge 61 of lip 60 to thereby support the umbrella 50 on control rod 13 and (optionally) prevent movement of umbrella 50 along control rod 13 unless sufficient force is applied to umbrella 50. Control rod 13 may optionally include one or more surface features such as raised annular ridges (not shown) to retain umbrella 50 at a selected location on control rod 13.

Figure 10:
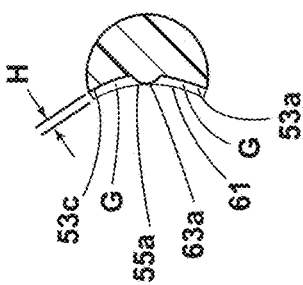
FIG. 10 is an enlarged fragmentary cross-sectional view of the region identified as X in FIG. 9.
Figure 9:
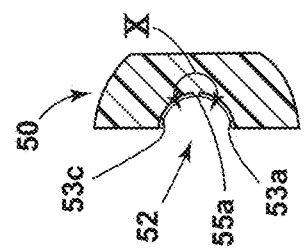
FIG. 9 is a partial cross-sectional top view of the umbrella taken along line IX-IX in FIG. 8.

With reference to FIGS. 6A and 10, the lip 60 and ribs 55a-55c may generally project inwardly a distance "H" from cylindrical surface portions 53a-53c of aperture 52. If the dimension "D" is selected to provide an interference fit when umbrella 50 is installed on control rod 13, when assembled, the lip 60 and ribs 55a-55c will be deformed somewhat, such that the outer surface control rod 13 is spaced apart from cylindrical inner surface portions 53a-53c, a distance that is slightly less than the dimension H. In general, the dimension H may be about 0.010 inches-0.100 inches, and more preferably is about 0.020-0.040 inches. The dimension D is preferably about equal to a diameter of control rod 13, or slightly smaller than a diameter of control rod 13. If the dimension D is smaller than a diameter of control rod 13, the dimension D may be about 0.005-0.020 inches smaller than a diameter of the control rod 13 to provide a tight interference fit to prevent entry of water into aperture 52 when umbrella 50 is installed on control rod 13. It will be understood that these dimensions are merely examples, and the dimensions may be varied (including outside of the ranges noted above) as required for a particular application.

Umbrella 50 may include a chamfer 64 at an end 65 of central hub 59 to facilitate assembly of umbrella 50 on control rod 13. Hub 59 may include a cylindrical outer surface 66 that is spaced-apart from tapered inner surface 67 of shell 58 to form an annular groove 68 that is generally V-shaped in cross-section as shown in FIG. 6.

During assembly, the umbrella 50 is positioned on control rod 13 (FIGS. 2-4), and cap 30 and bearing housing 31 are also positioned on control rod 13. Aperture 34 of cap 30 may have a diameter that is slightly larger than a diameter of the control rod 13 whereby the cap 30 and bearing housing 31 slide freely along control rod 13. Alternatively, cap 30 and/or bearing housing 31 may fit tightly against control rod 13 to provide frictional damping as control rod 13 moves. Spring 27 is then positioned on control rod 13, and end cap 25 is also then placed on control rod 13 such that the spring 27 is disposed between end cap 25 and bearing assembly 31. End 22 of control rod 13 may then be deformed to retain end cap 25 on control rod 13.

The water passageway (e.g., grooves 35a-35d) allows liquids to drain when surface 32 engages mounting bracket 17. The umbrella 50 directs liquid out and away from cap 30, and preferably provides a watertight seal around rod 30.

It will become apparent to those skilled in the art that various modifications to the preferred embodiment of the invention as described herein can be made without departing from the spirit or scope of the invention as defined by the appended claims.

The invention claimed is:

1. A damper for a washing machine having a cabinet and a drum, the cabinet having a plurality of fixed brackets and the drum having a plurality of brackets, said damper comprising:
    a control rod configured to attach to one of the plurality of fixed brackets;
    a first cap having an interior surface defining an aperture through which the control rod slidingly extends, the first cap configured to engage a portion of one of the plurality of brackets on the drum;
    a second cap disposed on the control rod; and
    a spring disposed between the first cap and the second cap;
    wherein the first cap includes a peripheral outer edge and an upwardly facing outer surface, the upwardly facing outer surface including a center portion extending around the aperture and intersecting the interior surface to define an edge that engages the control rod whereby water traveling downwardly along the control rod is prevented from entering the aperture, the first cap further including at least one upwardly opening groove extending from the center portion of the upwardly facing outer surface to the peripheral outer edge of the first cap for guiding water along the outer surface of the first cap from the center portion to the peripheral outer edge of the first cap.

2. The damper as defined in claim 1, wherein:
    the control rod includes a cylindrical outer surface;
    the edge forms a continuous circle that engages the cylindrical outer surface of the control rod.

3. The damper as defined in claim 1, wherein:
    the upwardly facing outer surface of the first cap includes a convex generally hemispherical portion extending from the edge portion to the peripheral outer edge of the first cap, and wherein the at least one upwardly facing groove is formed in the generally hemispherical portion of the upwardly facing outer surface and extends from the edge portion of the upwardly facing outer surface to the peripheral outer edge of the first cap.

4. The damper as defined in claim 3, wherein:
    the first cap includes a central hub and an upper wall extending from the central hub to a cylindrical rim, wherein the generally hemispherical portion of the upwardly facing outer surface comprises an upper surface of the upper wall, the cylindrical rim extending downwardly from the upper wall and having a cylindrical outer surface defining the peripheral outer edge of the first cap, and wherein the aperture extends through the central hub, the aperture comprising the only aperture through the first cap such that water cannot pass through any portion of the first cap.

5. The damper as defined in claim 1, further comprising:
an umbrella having an aperture for receiving the control rod, the umbrella disposed on the control rod above the first cap to shed water flowing down the control rod away from the control rod.

6. The damper as defined in claim 1, wherein:
the at least one groove comprises a plurality of grooves.

7. The damper as defined in claim 6, wherein:
the grooves are spaced apart and extend radially outwardly from a center of the first cap.

8. The damper as defined in claim 1, wherein:
the center portion of the upwardly facing outer surface defines an uppermost surface of the first cap.

9. A damper for a washing machine having a cabinet and a drum, the cabinet having a plurality of fixed brackets and the drum having a plurality of brackets, said damper comprising: a control rod configured to attach to one of the plurality of fixed brackets; a first cap having an aperture through which the control rod slidingly extends, the first cap configured to engage a portion of one of the plurality of brackets on the drum; a second cap disposed on the control rod; a spring disposed between the first cap and the second cap; wherein the first cap includes at least one water passageway for guiding water along an outer surface of the first cap;
an umbrella having an aperture for receiving the control rod, the umbrella disposed on the control rod above the first cap to shed water flowing down the control rod away from the control rod; and wherein: the umbrella comprises an aperture having a plurality of inwardly-projecting surfaces that contact the control rod, the aperture further including at least one surface that is spaced-apart from an outer surface of the control rod.

10. The damper as defined in claim 9, wherein:
the aperture comprises an annular flange projecting inwardly at an upper surface of the umbrella and sealingly contacting the control rod.

11. A damper for a washing machine having a cabinet and a drum, the cabinet having a plurality of fixed brackets and the drum having a plurality of brackets, said damper comprising:

a control rod having an end for attaching to one of the plurality of fixed brackets;
a bearing having an aperture through which the control rod slidingly extends, the bearing configured to engage one of the plurality of brackets on the drum;
an end cap disposed at a bottom end of the control rod;
a spring disposed between the end cap and the bearing; and
an umbrella having an aperture for receiving the control rod, the umbrella disposed on the control rod above the bearing to shed water flowing down the control rod away from the control rod, wherein an upper edge of the aperture sealingly engages the control rod, and wherein a surface of a lower portion of the aperture is spaced-apart from the control rod to form a gap.

12. The damper as defined in claim 11, wherein:
the aperture of the umbrella is defined by an inner surface of the umbrella, the inner surface having a first portion and a plurality of raised surface features projecting inwardly from the first portion whereby the raised surface features engage the control rod and form a gap between the first portion and the rod.

13. The damper as defined in claim 12, wherein:
the gap has an open bottom to permit fluid to drain out of the gap.

14. The damper as defined in claim 12, wherein:
the first portion of the inner surface is substantially cylindrical.

15. The damper as defined in claim 12, wherein:
the raised surface features comprise ridges.

16. The damper as defined in claim 15, wherein:
the ridges extend lengthwise along the control rod.

17. The damper as defined in claim 11, wherein:
the upper edge comprises an inwardly-extending tapered flange.

18. The damper as defined in claim 17, wherein:
the tapered flange has a circular inner edge that engages the control rod.

19. The damper as defined in claim 18, wherein:
the inner edge is elastically deformed and forms a water-tight interference fit around the control rod.

20. The damper as defined in claim 11, wherein:
the bearing includes an outer surface having at least one water passageway formed by a groove in the outer surface of the bearing, wherein the outer surface is substantially hemispherical and the groove extends radially outward from the aperture in the bearing.

* * * * *

UNITED STATES PATENT AND TRADEMARK OFFICE
CERTIFICATE OF CORRECTION

PATENT NO. : 11,649,578 B2  
APPLICATION NO. : 17/078984  
DATED : May 16, 2023  
INVENTOR(S) : Wilkinson, III et al.

Page 1 of 1

It is certified that error appears in the above-identified patent and that said Letters Patent is hereby corrected as shown below:

In the Claims

Column 7, Lines 24-25, after "comprising:" insert a --"¶"--;

Column 7, Line 26, after "brackets;" insert a --"¶"--;

Column 7, Line 29, after "drum;" insert a --"¶"--;

Column 7, Line 30, after "rod;" insert a --"¶"--;

Column 7, Line 31, after "cap;" insert a --"¶"--;

Column 7, Line 37, after "wherein;" insert a --"¶"--.

Signed and Sealed this  
Fifth Day of March, 2024

Katherine Kelly Vidal  
*Director of the United States Patent and Trademark Office*